Oct. 6, 1942.  W. B. ANDERSON  2,297,859
REFRIGERATION APPARATUS
Filed Feb. 5, 1941  4 Sheets-Sheet 1
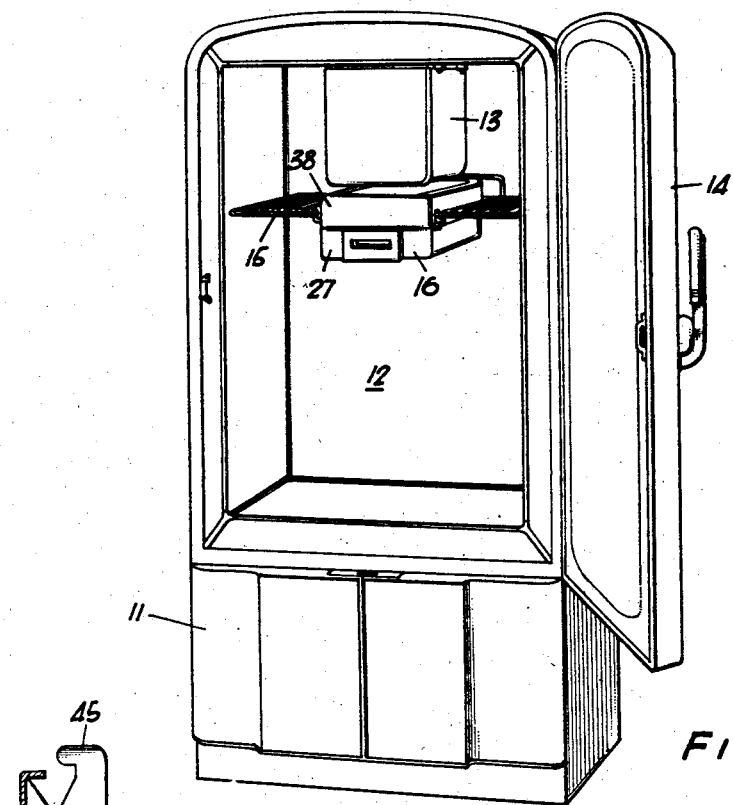
FIG. 1.
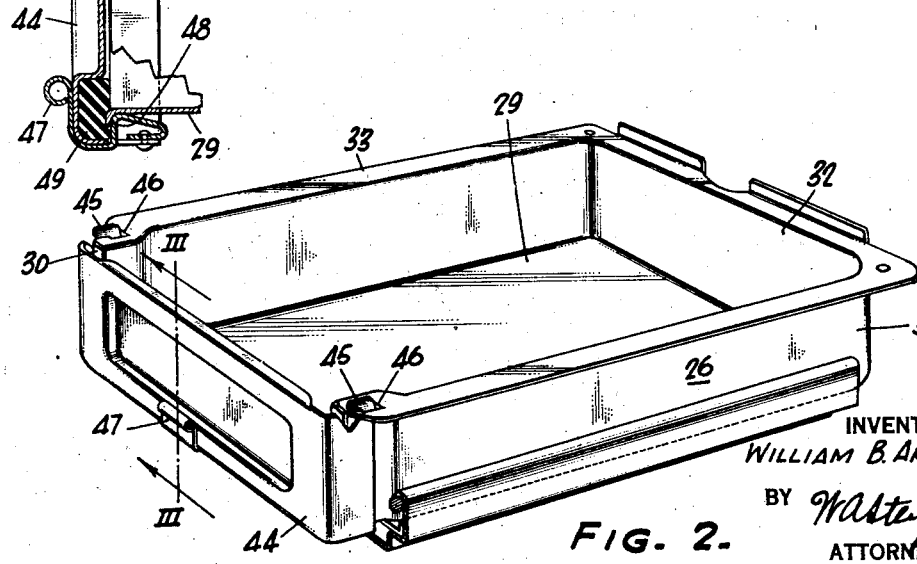
FIG. 3.
FIG. 2.
INVENTOR
WILLIAM B. ANDERSON
BY
ATTORNEY Oct. 6, 1942.  W. B. ANDERSON  2,297,859
REFRIGERATION APPARATUS
Filed Feb. 5, 1941  4 Sheets-Sheet 2

WITNESSES:

INVENTOR
WILLIAM B. ANDERSON
BY
ATTORNEY

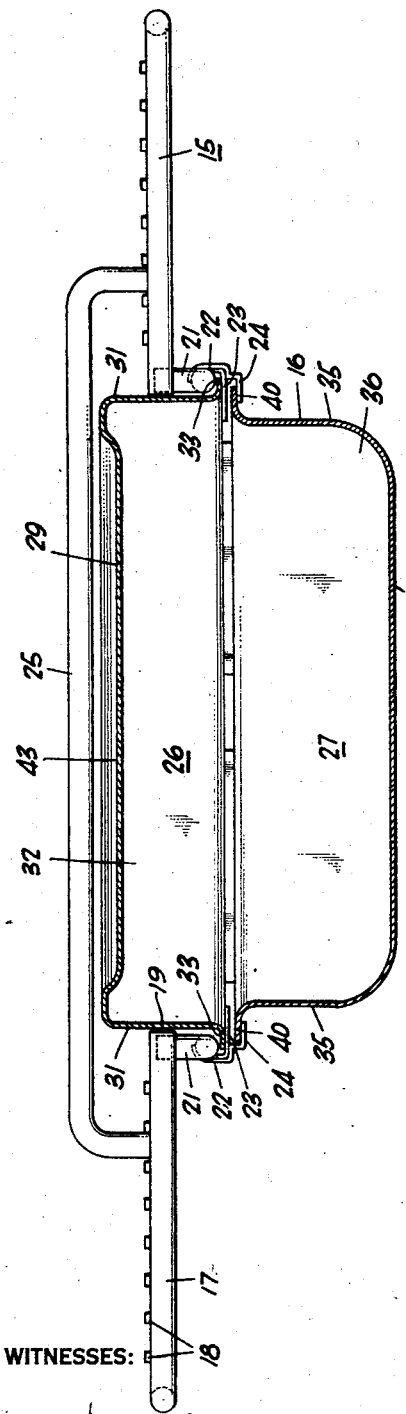
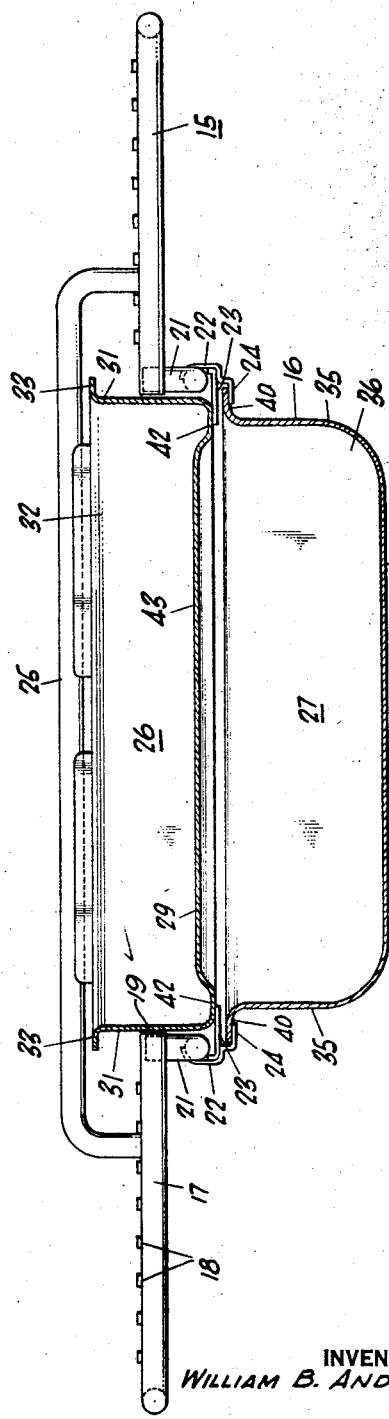

Oct. 6, 1942. W. B. ANDERSON 2,297,859
REFRIGERATION APPARATUS
Filed Feb. 5, 1941 4 Sheets-Sheet 4
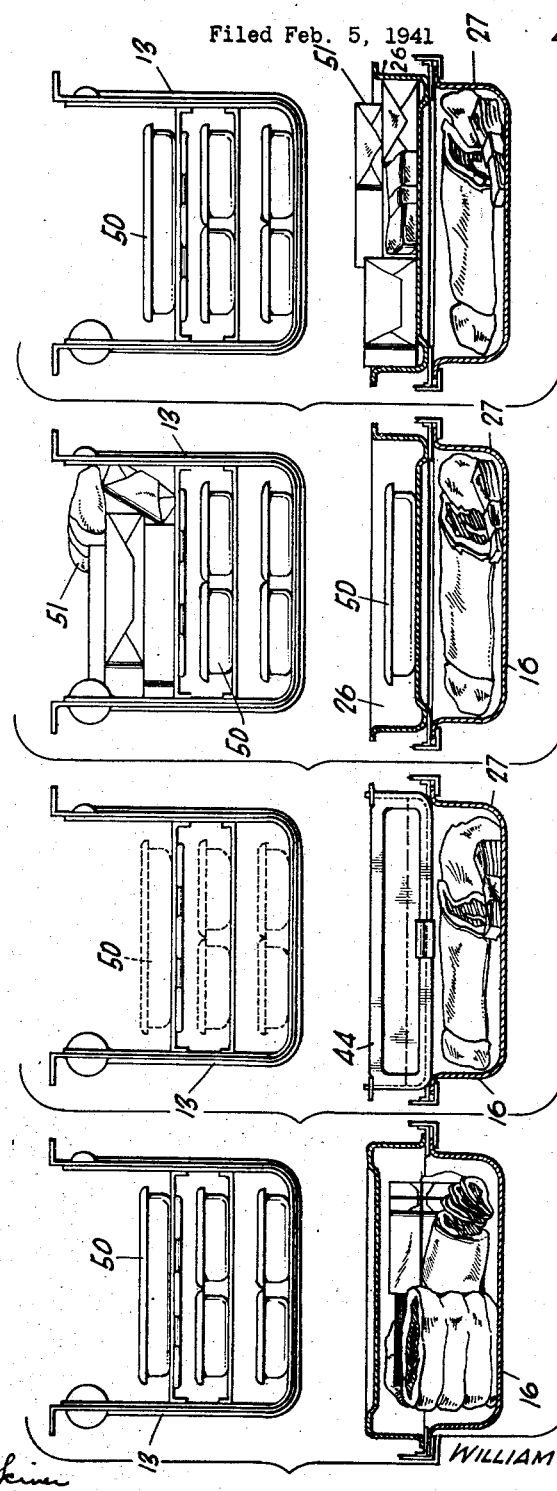
WITNESSES:
INVENTOR
WILLIAM B. ANDERSON
BY
ATTORNEY Patented Oct. 6, 1942

2,297,859

UNITED STATES PATENT OFFICE 2,297,859

REFRIGERATION APPARATUS

William B. Anderson, West Springfield, Mass., assignor to Westinghouse Electric & Manufacturing Company, East Pittsburgh, Pa., a corporation of Pennsylvania Application February 5, 1941, Serial No. 377,453

7 Claims. (Cl. 62—89)

My invention relates to refrigeration apparatus and particularly to storage receptacles for meat and the like, for use primarily in domestic refrigerators.

It is an object of my invention to provide an improved receptacle for the storage of meats in refrigerators, which has adequate heat transfer facilities to maintain the meats in edible condition for long periods of time, and which is exceptionally accessible.

It is another object of my invention to provide an accessible and compact meat storage receptacle which is constructed and arranged so that, when desired, it functions as a storage container for frozen foods, or ice, or as a collector for defrost water, and at the same time has a portion thereof available as a meat storage receptacle.

These and other objects are effected by my invention as will be apparent from the following description and claims taken in connection with the accompanying drawings, forming a part of this application, in which:

Fig. 1 is a perspective view of a refrigerator cabinet embodying my invention;

Fig. 2 is a perspective view of a portion of the support for the food storage receptacle with the top pan of the latter shown in position to catch defrost water or store excess ice cubes, and with a removable dam attached thereto;

Fig. 3 is a sectional view taken on line III—III of Fig. 2;

Fig. 5 is a sectional view of the storage container shown in Fig. 4, with the shelf support shown in elevation;

Fig. 6 is a view similar to Fig. 5, with the top pan of the food storage receptacle inverted in the manner shown in Fig. 2; and, Figs. 7, 8, 9, and 10 are schematic views showing various possible arrangements of the meat storage receptacle, ice trays, frozen food packages, and ice cube storage in a domestic refrigerator.

Figure 4:
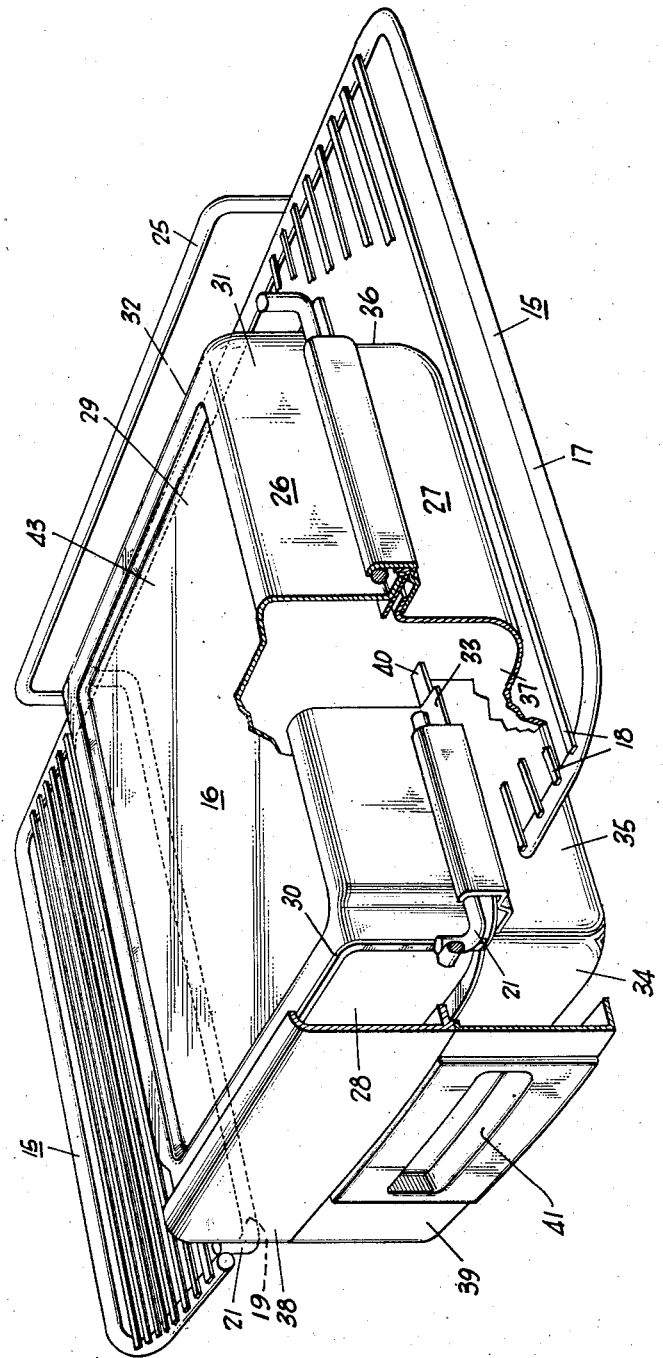
Fig. 4 is a perspective view with parts broken away of the complete food storage receptacle and its shelf support.

Referring specifically to the drawings for a detailed description of the invention, numeral 11 designates a refrigerator cabinet having a food storage compartment 12, a cooling element or evaporator 13 for cooling the food storage compartment and a door 14 for closing the food storage compartment.

A shelf, generally designated by the numeral 15, is disposed in the food storage compartment 12 and supports a food storage receptacle 16 directly beneath the evaporator. As shown in Fig. 1, the horizontal area of the food storage receptacle 16 substantially coincides with the horizontal projected area of the evaporator 13. The shelf 15 is formed from a heavy rectangular bar 17 which is open at the front. Supporting racks 18 are fastened to the bar 17 and preferably extend from front to rear of food storage compartment 12. The supporting racks extend from the sides of the shelf to inward extremities 18 of the bar 17 at the front of the shelf, thus providing an open central portion 19 which receives the storage receptacle 16.

Heavy U-shaped braces 21 extend between the inward extremities 18 of bar 17 and the rear of the bar 17. Slide members 22 are fastened to the braces 21 and include two slideways 23 and 24, one above the other. A heavy reinforcing bar 25 is fastened at the rear of the bar 17, as best shown in Fig. 4, and prevents the shelf 15 from sagging.

The storage receptacle 16 embodies an upper pan-shaped member 26 and a lower pan-shaped member 27. The upper pan-shaped member 26 is provided with top, side and rear walls 29, 31 and 32, respectively, being open at the front, as shown at 28. A flange 33 is formed on the side and rear walls and another flange 30 on the side walls 31 around the open front 28. The area of the side and rear walls 31 and 32 is quite substantial, preferably at least 50% of the area of the top wall 29. By forming the upper pan with side and rear walls of substantial area, improved heat transfer from the contents of the storage receptacle 16 to the top wall 29, and thence to evaporator 13, is effected.

The lower pan member 27 embodies front, side, rear and bottom walls numbered 34, 35, 36, and 37, respectively, and having a flange 40 formed on the top of the side and rear walls. The front wall 34 extends upwardly a sufficient distance to form a cover 38 for the open front 28 of the upper pan member 26. By constructing the top pan with an open front 28 and providing the cover 38 carried by the lower pan 27, improved accessibility to the interior of the food storage receptacle is obtained when the lower pan 27 is moved forwardly in a manner hereinafter described. This feature is fully described and claimed in the copending application of Orland H. Yoxsimer, Serial No. 350,633, filed August 3, 1940, for Refrigeration apparatus and assigned to the Westinghouse Electric & Manufacturing Company.

As shown in Fig. 4, a false front 39 including a handle 41 is attached to the front wall 34 of the lower pan member 27 and is preferably flush with the cover 38.

When the pans 26 and 27 are in the position shown in Figs. 4, 5, and 7, the flanges 33 of the upper pan 26 are supported on the upper slideway 23 and the flange 40 of the lower pan 27 is supported on the lower slideway 24. The lower pan 27 with its contents is, therefore, slidable outwardly with respect to the upper pan when the food compartment door 14 is open. After the lower pan 27 is completely or partially removed, the upper pan 26 may also be slid off the slideway 23 and may be either left out or placed in the position shown in Figs. 6, 8, 9, or 10 wherein flat marginal portions 42 on the wall 29 of the upper pan are supported on the upper slideway 23. A central depressed portion 43 in the wall 29 is useful for retaining incidental drip water from evaporator 13 when the upper pan 26 is in the position shown in Fig. 4.

Referring now to Figs. 2, 3, 6, and 8, when the evaporator 13 requires defrosting, it is advantageous to provide a fairly large pan to receive defrost water and also to retain a space in the food storage container 16 for the storage of meat and the like. In order to attain these objects, the upper pan 26 is inverted to the position shown, for example, in Figs. 2 and 8. However, because the upper pan 26 is open at 28 at the front thereof, a removable watertight front or dam 44 is provided. The dam 44 is provided with attaching locks 45 which extend through apertures 46 located in the flange 33 at the front of the two side walls 31. A spring latch 47 is provided at the bottom of the dam 44 and, as shown in Fig. 3, engages with a flange 48 on the bottom wall 29 of the upper pan 26. A sponge rubber gasket 49 extending around the bottom and sides of the dam 44 engages the front flange 30 of upper pan 26 and effects a water-tight seal between the dam and the front of the upper pan so that defrost water may be collected in the upper pan.

Schematic Figs. 7, 8, 9, and 10 show the various arrangements of meats, frozen foods, ice storage and defrosting that may be utilized. They also illustrate how the space occupied normally by a meat storage receptacle may be fully utilized for other purposes, since many times only small quantities of meat are being stored in the receptacle 16.

Fig. 7 shows the storage receptacle 16 in position to accommodate large quantities of meat or the like, and also shows ice trays 50 on the freezing surfaces of the evaporator 13.

Fig. 8 shows the storage container 16 in the defrosting position with the removable dam 44 in place and the ice trays 50 preferably removed from the evaporator 13. The dotted line represents the level of water from defrosting. The lower pan 27 serves as a meat storage receptacle even during defrosting.

Fig. 9 shows the storage container 16 in position to receive meat in the lower pan 27 and ice trays 50 with ice therein or loose ice cubes in the upper pan 26. Because of the proximity to the evaporator 13, ice cubes in the upper pan 26 will not melt until a long period of time has elapsed. If ice trays with ice therein are stored, the dam 44 may or may not be used. If loose ice cubes are stored, it is preferable to use the removable dam 44. Frozen foods 51 may be stored in the upper part of the evaporator 13 so that they remain frozen, since the ice tray normally on the upper shelf is in the container 26. It is, therefore, possible to store frozen foods in the evaporator at below freezing temperatures without decreasing the ice storage capacity of the refrigerator.

Fig. 10 shows another possible arrangement wherein the frozen foods 51 are stored in the upper pan 26, meat in the lower pan 27, and ice trays 50 in the evaporator 13. As in the case of ice cubes, frozen foods stored in the upper pan 26 will not thaw out for long periods of time because of their proximity to evaporator 13.

From the foregoing it will be apparent that I have provided an extremely flexible and accessible food storage container for refrigerators which keeps meats and the like in edible condition for long periods of time.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A meat storage receptacle for a refrigerator embodying an ice freezing cooling unit which requires defrosting at intervals, said storage receptacle embodying a rectangular lower pan having substantially vertically extending front, side and rear walls, a cover for said lower pan comprising an upper pan having side and rear walls extending downwardly therefrom and being normally open at the front thereof, the lower pan being slidable with respect to the upper pan from a closed to an open position to provide access to the interior of the receptacle, the front wall of said lower pan being extended upwardly to cover the open front of the upper pan when the receptacle is in its closed position, whereby free access to the interior of the receptacle is provided when the receptacle is in its open position, said upper pan being inverted from its normal position for receiving defrost water when the cooling unit is defrosted, and means providing a subtsantially water-tight closure for the open end of the upper pan during said defrosting.

2. A meat storage receptacle for a refrigerator embodying an access door and an ice freezing cooling unit which requires defrosting at intervals, said receptacle embodying a lower pan having a substantially vertical upwardly-extending wall of appreciable extent facing the access opening, a cover for said lower pan comprising an upper pan having downwardly extending walls and being normally open for an appreciable extent thereof facing said access opening, the lower pan being movable horizontally with respect to the upper pan from a closed to an open position to gain access to the interior of the receptacle, said vertical wall of the lower pan facing the access opening being extended upwardly to cover the open portion of the downwardly-extending walls of the upper pan, when the receptacle is in its closed position, whereby free access to the interior of the receptacle is provided when the receptacle is in its open position, said upper pan being inverted from its normal position for receiving defrost water when the cooling unit is defrosted, and means providing a substantially water-tight closure for the open end of the upper pan during said defrosting.

3. A meat storage receptacle for a refrigerator embodying an access door and an ice freezing cooling unit which requires defrosting at intervals, said receptacle embodying a lower pan having substantially vertically-extending outer walls, a cover for said lower pan comprising an upper pan having downwardly-extending outer walls, said downwardly-extending walls being open for an appreciable distance, the lower pan being movable horizontally with respect to the upper pan from a closed to open position to obtain access to the receptacle, said vertical walls of the lower pan being extended upwardly to cover the open portion of the downwardly-extending walls of the upper pan when the receptacle is in its closed position, whereby free access to the interior of the receptacle is provided when the receptacle is in its open position, said upper pan being inverted from its normal position for receiving defrost water when the cooling unit is defrosted, and means providing a substantially water-tight closure for the open end of the upper pan during said defrosting.

4. A meat storage receptacle for a refrigerator embodying an ice freezing cooling unit which requires defrosting at intervals, said storage receptacle embodying a rectangular lower pan having substantially vertically extending front, side and rear walls, a cover for said lower pan comprising an upper pan having side and rear walls extending downwardly therefrom and being normally open at the front thereof, the lower pan being slidable with respect to the upper pan from a closed to an open position to provide access to the interior of the receptacle, the front wall of said lower pan being extended upwardly to cover the open front of the upper pan when the receptacle is in its closed position, whereby free access to the interior of the receptacle is provided when the receptacle is in its open position, said receptacle being disposed adjacent to and directly below the cooling unit, said upper pan being inverted from its normal position for storing ice or for receiving defrost water when the cooling unit is defrosted, and means providing a substantially water-tight closure for the open end of the upper pan during said defrosting.

5. A meat storage receptacle for a refrigerator embodying an ice freezing cooling unit which requires defrosting at intervals, said storage receptacle embodying a rectangular lower pan having substantially vertically-extending front, side and rear walls, a cover for said lower pan comprising an upper pan having side and rear walls extending downwardly therefrom and being normally open at the front thereof, the lower pan being slidable with respect to the upper pan from a closed to an open position to provide access to the interior of the receptacle, the front wall of said lower pan being extended upwardly to cover the open front of the upper pan when the receptacle is in its closed position, whereby free access to the interior of the receptacle is provided when the receptacle is in its open position, said upper pan being inverted from its normal position for receiving defrost water when the cooling unit is defrosted, and means providing a substantially water-tight closure for the open end of the upper pan during said defrosting, said upper pan when in inverted position providing a cover for the lower pan so that a meat storage container of reduced capacity is available during defrosting.

6. A meat storage receptacle for a refrigerator embodying an ice freezing cooling unit which requires defrosting at intervals, said storage receptacle embodying a rectangular lower pan having substantially vertically extending front, side and rear walls, a cover for said lower pan comprising an upper pan having side and rear walls extending downwardly therefrom and being normally open at the front thereof, the lower pan being slidable with respect to the upper pan from a closed to an open position to provide access to the interior of the receptacle, the front wall of said lower pan being extended upwardly to cover the open front of the upper pan when the receptacle is in its closed position, whereby free access to the interior of the receptacle is provided when the receptacle is in its open position, said receptacle being disposed adjacent to and directly below the cooling unit, said upper pan being inverted from its normal position for storing ice or for receiving defrost water when the cooling unit is defrosted, and means providing a substantially water-tight closure for the open end of the upper pan during said defrosting, said upper pan when in inverted position providing a cover for the lower pan so that the lower pan provides a meat storage container of reduced capacity during ice storage or defrosting.

7. A meat storage receptacle for a refrigerator embodying an ice freezing cooling unit which requires defrosting at intervals, said receptacle embodying a lower pan, a cover for said lower pan having downwardly-extending marginal walls, said downwardly-extending walls having an opening therein, said cover being inverted from its normal position for receiving defrost water when the cooling unit is defrosted, and means providing a substantially water-tight closure for said opening during said defrosting.

WILLIAM B. ANDERSON.